United States Patent [19]
Kolodjski

[11] Patent Number: 4,787,251
[45] Date of Patent: Nov. 29, 1988

[54] DIRECTIONAL LOW DIFFERENTIAL PRESSURE TRANSDUCER

[75] Inventor: Kenneth J. Kolodjski, Minneapolis, Minn.

[73] Assignee: TSI Incorporated, St. Paul, Minn.

[21] Appl. No.: 73,731

[22] Filed: Jul. 15, 1987

[51] Int. Cl.[4] .......................................... G01L 21/12
[52] U.S. Cl. ................... 73/755; 73/204.17; 73/861.63; 73/204.19
[58] Field of Search ................ 73/719, 755, 188, 189, 73/180, 182, 204, 861.42, 861.63, 708, 700

[56] References Cited

U.S. PATENT DOCUMENTS

| | | | |
|---|---|---|---|
| 2,214,181 | 9/1940 | Rylsky | 73/755 |
| 2,358,467 | 9/1944 | Minter | 73/755 |
| 3,159,998 | 12/1964 | Minter | 73/755 |
| 3,333,070 | 7/1967 | Golden | 200/46 |
| 3,352,154 | 11/1967 | Djorup | 73/189 |
| 3,374,676 | 3/1968 | Brenot | 73/755 |
| 3,592,055 | 7/1971 | Dorman | 73/188 |
| 3,604,261 | 9/1971 | Olin | 73/189 |
| 3,677,085 | 7/1972 | Hayakawa | 73/204 |
| 3,900,819 | 8/1975 | Djorup | 338/320 |
| 3,995,481 | 12/1976 | Djorup | 73/189 |
| 4,024,761 | 5/1977 | Djorup | 73/204 |
| 4,206,638 | 6/1980 | Djorup | 73/189 |
| 4,279,147 | 7/1981 | Djorup | 73/189 |
| 4,541,286 | 9/1985 | Holme | 73/755 |

*Primary Examiner*—Donald O. Woodiel
*Attorney, Agent, or Firm*—Merchant, Gould, Smith, Edell, Welter & Schmidt

[57] ABSTRACT

A pressure differential measuring apparatus (25) wherein the direction of fluid flow (5) is determined by calculating the ratio between pressures of two discrete fluid masses (3, 4). The device includes two tandem thermal sensors (7, 6), the upstream sensor creating a thermal wake which is carried past the downstream sensor, thereby slowing the downstream sensor's nominal cooling rate. A venturi (8) is utilized to create desired flow characteristics in the region of the sensors.

7 Claims, 2 Drawing Sheets

DIRECTIONAL LOW DIFFERENTIAL PRESSURE TRANSDUCER

BACKGROUND OF THE INVENTION

This invention relates to a differential pressure transducer for the measurement of pressure difference between two isolated or separately controlled spaces, rooms, or chambers where air (or any other gas) is nearly at the same pressure in the two spaces but small differences are important to measure.

To measure the small pressure difference, a small tube or passageway is connected between the two spaces so that the gas flows in the tube from the higher pressure to the lower pressure chamber. The flow rate will be proportional to the pressure difference in accordance with principles expounded by Bernoulli. Two thermal sensors similar to hot wire or hot film anemometer sensors are mounted inside the tube or passageway at a location where such tube is horizontal and in such a way that one sensor is always directly upstream from the other.

Sensing instruments known as hot wire or hot film anemometers have been developed for measuring fluid flow parameters such as velocity and mass rate of flow. They are particularly applicable for this device because their sensitivity increases at lower flow rates making ideal sensors for measuring small differential pressures. Example of this type of anemometer and circuits therefor are shown in U.S. Pat. Nos. 3,333,070, 3,352,154, 3,592,055, 3,604,261, 3,677,085, 3,900,819, 3,995,481, 4,024,761, 4,206,638, 4,279,147.

When a single thermal sensor is mounted in a tube, it can sense the velocity of flow but typically cannot sense the direction of flow. If the higher pressure chamber is always the same so that the direction of flow is known, then the problem of determining variations in flow direction does not exist. However, when the higher pressure changes from side to side so the direction of flow in the flow measuring tube changes, it is necessary to have an indication of flow direction before the real pressure in either of the chambers is known relative to the other. This invention relates to a method for measuring the pressure difference with the direction or sign (plus or minus) known at all times even when the pressure difference is very small.

A thermal sensor is heated electrically and controlled by the hot wire anemometer circuit to be self heated at an elevated temperatue relative to the flow stream. Hence, when flow passes over the heated sensor, it heats the air (or gas) as it goes by, creating a thermal wake or heated portion of air. If another similar sensor is located such that it is in the thermal wake of the first sensor, the temperature difference that this second sensor encounters is altered because the air passing over it is a higher temperature. It is important that the flow tube be horizontal to avoid discrepancies due to free convention flow generated by thermal sensors at very low flow rates. When a means is determined to indicate which sensor is experiencing the wake of the other sensor, then the direction of flow is known. Then also, the upstream unaffected sensor sensor can be selected for the flow measurement to sense the pressure difference.

It is the object of the present invention to provide a novel and improved pressure transducer that overcomes the prior problems of sensing direction in a pressure transducer that utilizes heated sensors in a flow between two spaces.

It is another object of this invention to provide a directional pressure transducer utilizing thermal sensing in flow tube with the thermal wake of one heated sensor affecting a second heated sensor to provide a directional sensor particularly at low velocities. This can be done if there are no obstructions or connecting bodies between the two sensors that disturb the thermal wake as in other previous directional thermal sensors.

It is another object of this invention to provide a novel and improved pressure transducer that employs a flow tube with two similar thermal sensors mounted within where such sensors are heated metal, core wound wire, surface film, or other electrically-heated resistance elements of various types of shapes that result in the first sensor generating a significant thermal wake to be sensed by the second similar sensor when properly aligned in a downstream direction. It is important that the thermal sensors are mounted so they are suspended in the flow stream so that the fluid flows completely around or almost completely around the thermal sensors to optimize the generation of the thermal wake to be sensed by the other similar thermal sensor. This pair of thermal sensors are connected in series and are electrically heated and controlled so that their total series resistance is maintained constant by feedback operation. Then the voltage at the junction of the two sensors can be monitored to indicate a change in value which in turn indicates direction while the total series output of the two thermal sensors is electrically monitored to indicate flow. Alternately, this pair of thermal sensors are controlled individually by two separate hot wire anemometer type circuits where the electrical outputs are compared to sense which sensor has sensed the thermal wake and has experienced a shift in calibration, and thereby, indicating direction.

DETAILED DESCRIPTION OF THE INVENTION

Figure 1:
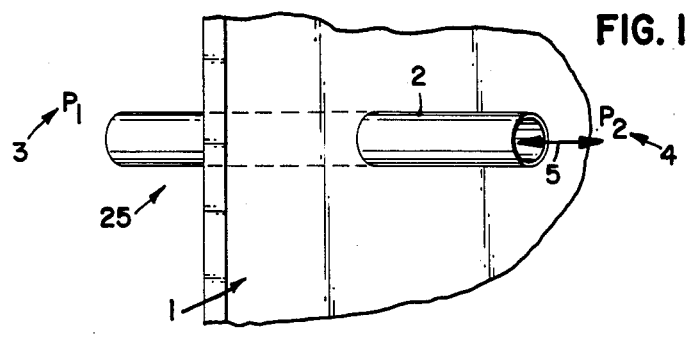
FIG. 1 is a perspective view showing a pressure sensing apparatus constructed according to the principles of the present invention.
Figure 2:
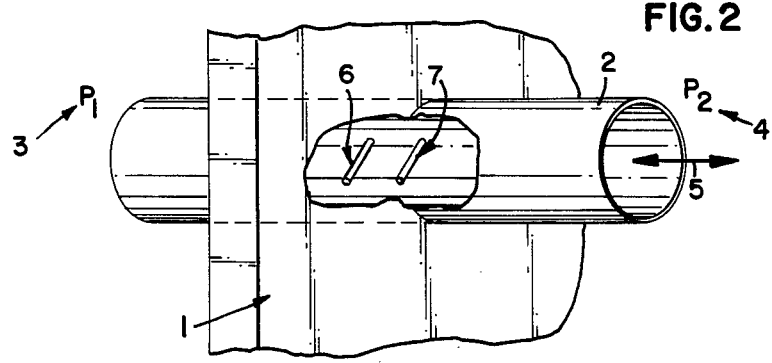
FIG. 2 is a perspective view, with a cutaway portion, showing the placement of individual sensors and a device constructed according to the principles of the present invention.
Figure 3:
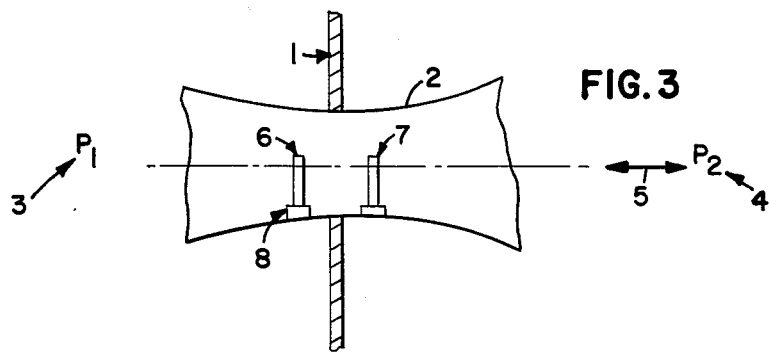
FIG. 3 is a sectional view of the apparatus as depicted in FIG. 1.

Referring now to the drawings, and in particular to FIG. 1, an apparatus constructed according to the principles of the present invention is shown generally at 25. The apparatus is shown passing through a wall 1 which may be any sort of partition that creates and maintains a relatively pressure impermeable barrier between two discrete fluid masses. The fluid mass may reside in an enclosed volume, or may reside in a chamber that is large enough to be equivalent to ambient atmospheric conditions. In the latter case, the chamber may be considered to be the entire atmosphere outside of a relatively smaller volume, such as the interior of a building. As seen in FIGS. 1 through 3, a first fluid mass possesses a nominal pressure 3, having the value of $P_1$. The second fluid mass has a nominal pressure 4, having a value of $P_2$.

Fluid communication between the two discrete fluid masses is provided by means of a passageway 2, which in the preferred embodiment is horizontally aligned and of a generally circular cross section. The direction of flow 5 between two discrete fluid masses must necessarily follow the horizontal path defined by fluid flow tube 2, the directional flow 5 being in either of two directions, that is, either toward or away from the first discrete fluid mass having a pressure value of $P_1$. The direction of flow will be away from the dispersed discrete fluid mass if $P_1$ is greater than $P_2$, and the direction of flow 5 will be toward the first discrete fluid mass if $P_2$ is greater than $P_1$.

The present invention is directed primarily towards the determination of the pressure difference between two fluid masses. In keeping with the nomenclature of FIGS. 1 through 3, the present device 25 is primarily directed towards determining if the ratio of $P_1/P_2$ is greater of less than 1.0, which would, therefore, serve to indicate the direction of flow path 5. This is accomplished by placing a first thermal sensor 6 and a second thermal sensor 7 in a tandem arrangement which intercepts the flow path, and due to differential heating of thermal sensors 6 and 7, creates a variation in electrical parameters which may be easily compared and measured, thereby providing an indication of which thermal sensor is the upstream sensor, and hence the direction of flowpath 5.

The thermal sensors 6 and 7 typically consist of an electrically nonconductive, cylindrical substrate body, upon the surface of which is wound a fine, electrically conductive wire or a thin, deposited film, typically composed of platinum metal. The substrate supporting body may be made from any suitable material that is electrically nonconductive, such as aluminum oxide and other ceramic materials such as quartz or glass. A plastic tubular substrate may be used and a variety of cross-sectional geometries may also be employed. The coiled wire or deposited film may have a further sheathing layer of electrically insulating material, and a protective, metallic outer material which provides electrical isolation from the circuitry to which the sensor coil or film is connected. The metal sheathing, when used, is typically composed of stainless steel or nickel. The metal sheathing is in direct contact with the fluid masses, thereby offering substantial advantages in terms of ruggedness and improved flashpoint protection in the event of any burnout of the sensor.

One surprising feature of the present invention is that the size or shape of the sensor is not new, critical, and, indeed, the sensor could be of a variety of shapes, such as cylindrical, spherical, or conical, each geometric shape being usable over a wide variety of aspect ratios. The sensor could also be simple wires.

As seen in FIGS. 2 and 3, thermal sensors 6 and 7 are oriented so as to be parallel to each other, and reside in a plane parallel to the direction of flowpath 5. The sensors are mounted through the wall 8 of flow tube 2, the inside wall 8 having an internal cross section that produces a venturi effect. The venturi provides the valuable benefits of both increasing fluid velocity past sensors 6 and 7, and in straightening and aligning the fluid flow streamlines. The sensors are separated from each other by a distance typically on the order of one to three sensor diameters.

The operation of the present invention, in particular the functioning of thermal sensors 6 and 7, is based on the fact that a heated object, placed in a flow of a fluid, will show some rate of heat transfer to the fluid. In particular, thermal sensors 6 and 7 will, when placed within the flow of a fluid as shown in FIG. 3, display a rate of heat transfer from the body to the fluid, assuming that some temperature difference exists between the sensors and the fluid. Typically, the sensor temperature is higher than the fluid temperature, on the order of 30°–100° C. In the simplest case, one can assume the fluid temperature to be constant, although this constraint is not necessary, as will be discussed later. The flow impinging on the upstream sensor, whether laminar or turbulent, is forced apart and heated by contact with the sensor, creating a distinctive and noticeable thermal wake in the fluid path. In other words, when the sensor is heated, as in the present case, the fluid passing by the sensor creates a thermal wake or heated portion of fluid which continues downstream. The thermal wake of the upstream sensor affects the behavior of the second, downstream sensor, its function being altered because the fluid passing over it is at some higher temperature. A corresponding difference in electrical resistance between the two sensors can be sensed by measuring the shift in voltage drop across each of the two sensors, or asuming that the sensors are kept at constant temperature, a different amount of electrical energy will be required to maintain each sensor 6 and 7 at the same constant temperature.

Figures 4, 5:
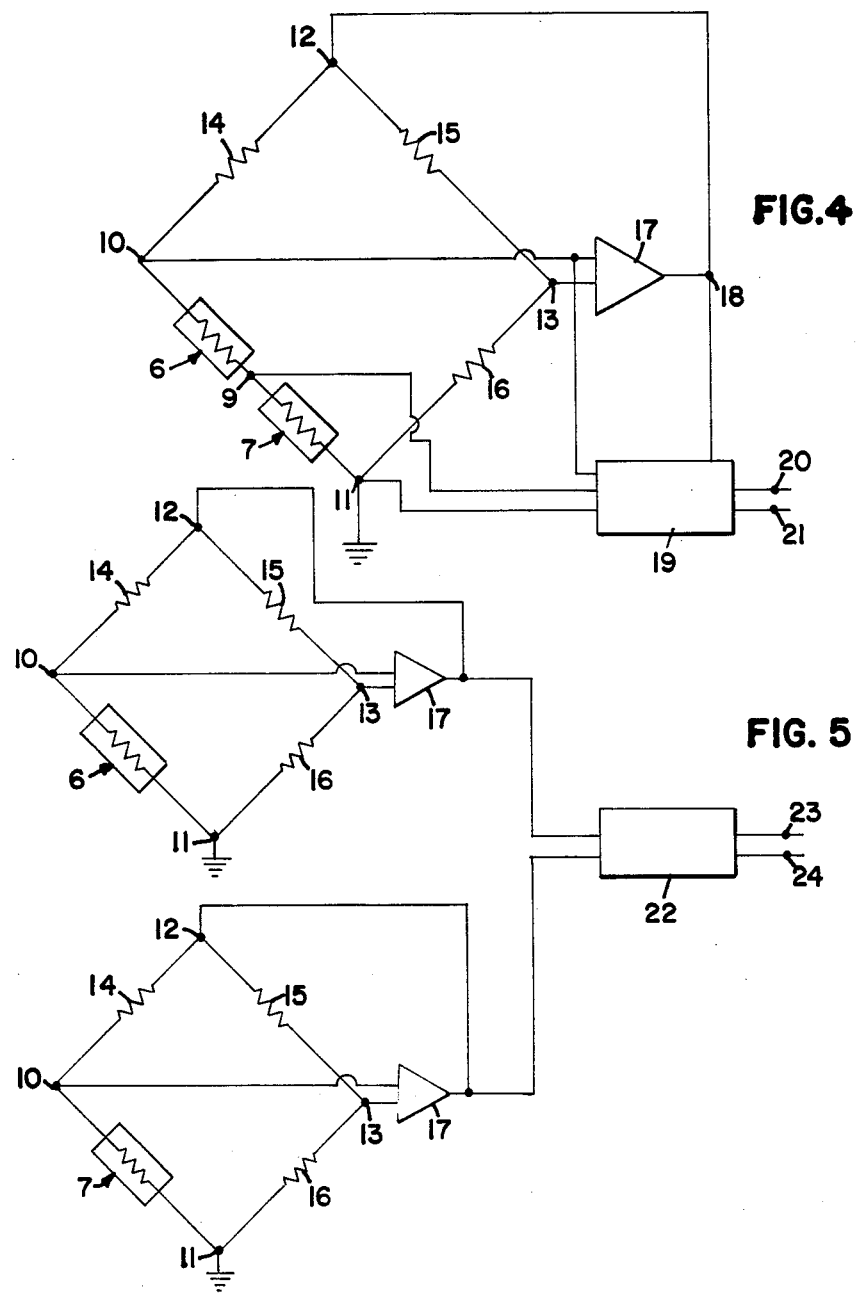
FIG. 4, is a simplified electrical schematic drawing which illustrates electrical excitation and indicating means for the apparatus for the type illustrated in FIG. 1.
FIG. 5 is a simplified electrical schematic drawing of a second embodiment of the excitation and indicating means of the apparatus as depicted in FIG. 1.

Thus, the direction of flow can be determined by electrical measurement of the change of relative resistance values of each sensing element 6 and 7 when they are compared with each other in a balanced bridge circuit. As seen in FIG. 4, the thermal sensors 6 and 7 may be connected in series as one arm of a four arm Wheatstone bridge, the remainder of which is also formed by first resistor 14, second resistor 15, and third resistor 16. The first resistor 14 passes the entire heating current that passes through sensors 6 and 7, the current passing through resistors 6 and 7 being necessarily identical. First resistor 14, second resistor 15, and third resistor 16 have fixed values selected to establish some nominal resistance levels for sensors 6 and 7 while minimizing unnecessary power dissipation in the nonactive parts of the bridge. An amplifier 17 is operatively connected to read the error signal which is developed between second junction 10 and fourth junction 13, and to amplify the signal and feed its output to the top of the bridge at junction 12 to vary the electrical current to the bridge to bring it back into balance whenever an unbalanced condition occurs between junction 10 and junction 13. The comparator 19 measures voltage values directly at second junction 10, first junction 9, fifth junction 12, and at ground junction 11. Note that amplifier output junction 18 and fifth junction 12 are electrically identical and constitute the signal feedback path between the amplifier 17 and the bridge circuit itself. The difference of potential between junction 12 and ground junction 11 is the primary measure of bridge imbalance. Thus, the primary requirement of comparator 19 is that it measure relevant bridge electrical values and, in this way, comparator 19 can determine immediately which sensor, 6 or 7, resides in the upstream direction. By operating the total resistance of both sensors 6 and 7 at a constant resistance value, the largest possible signal swing is caused to occur at first junction 9 where the sensors 6 and 7 are electrically connected. The voltage at first junction 9 will move as a signal shift caused by the change in resistance of first sensor 6 relative to second sensor 7, induced by the different heat loss seen by each sensing element.

In an alternate embodiment, a third temperature sensing element could be substituted within the bridge circuitry, thereby compensating for differences in ambient fluid temperature. For example, third resistor 16 could be replaced by a temperature sensor or temperature compensation network exposed to the fluid stream.

The output appearing within comparator 19 is bipolar, and indicates which sensing element, 6 or 7, faces the impinging fluid flow. The sensing element facing the flow will be caused by cooling to be lower in resistance than the downstream sensing element which is heated, or at least cooled less, and which will, therefore, increase in resistance.

In a second embodiment illustrated in FIG. 5, two separate hot wire anemometer circuits are formed, each being basically identical with the circuit shown in FIG. 4. In the embodiment shown in FIG. 5, sensors 6 and 7 each form one separate arm of the two separate four arm Wheatstone bridge circuits, the output of each Wheatstone bridge being fed to a comparator 22, which is capable of determining the direction of flow.

The outputs of each comparator, labeled 20-24 in FIGS. 4 and 5, may be used to indicate differential pressure with the direction or the high or low pressure side known, or to control some pressure regulating device in response to shifts in differential pressure. In practice, comparators 19 and 22 are relatively sophisticated, microprocessor-based devices having appropriate software to regulate a variety of laboratory, isolation room, clean room, and other ventilation-related applications.

I claim:
1. An apparatus for measuring differential pressure
   (a) a flow passageway between a first chamber and a second chamber, wherein at least one chamber contains a fluid, each chamber being in fluid communication with the other chamber via the flow passageway;
   (b) a first thermal sensor element and a second thermal sensor element, each sensor being mounted inside the flow passageway, the sensors being aligned in tandem such that each sensor is directly on a streamline occupied by the other sensor, each sensor being a temperature sensitive element, the temperature sensitive element having an electrical resistance that is a function of temperature, wherein a thermal wake created by passage of the fluid over the first sensor affects the temperature of the second sensor;
   (c) means for connecting each thermal sensor element in series, the series connected sensor elements residing in a bridge circuit wherein the two series connected sensor elements form a first arm of the bridge;
   (d) means for causing a current to flow through the two series connected sensor elements, thereby casuing each sensor element to be heated above the temperature of a surrounding flowing fluid;
   (e) means to regulate the current so as to cause resistance of the two series connected sensors to be held constant given a constant ambient fluid temperature;
   (f) means to connect a conductor to a junction between the two sensors;
   (g) means to measure a voltage at the junction; and
   (h) means to calculate which of the two sensors has a higher difference of potential relative to a predetermined reference difference of potential, thereby indicating which sensor is downstream from the other and thus indicating a flow direction and indicating that the upstream sensor is the flow sensor to be used for measuring flow velocity.

2. An apparatus according to claim 1 for measuring differential pressure further including a third sensor for sensing ambient fluid temperature, the third sensor having an element, the element having a resistance that is a function of temperature, the third sensor being connencted in a second arm of the bridge circuit, the third sensor causing the current regulating means to change the current flow through the bridge circuit so as to compensate for changes in the ambient fluid temperature.

3. An apparatus for measuring differential pressure comprising:
   (a) a flow passageway horizontally aligned between a first chamber and a second chamber, wherein at least one contains a fluid, each chamber being in fluid communication with the other chamber via the flow passageway;
   (b) a first sensor and a second sensor, each sensor being mounted inside the flow passageway, the sensors being aligned in tandem such that each sensor is directly on a streamline occupied by the other sensor in a horizontal direction, each sensor being a temperature sensitive element, the temperature sensitive element having an electrical resistance that is a function of temperature;
   (c) a first bridge circuit, the first sensor residing as a variable element within the first bridge circuit, the first bridge circuit producing a first bridge voltage;
   (d) a second bridge circuit, the second sensor residing as a variable element within the second bridge circuit, the second bridge circuit producing a second bridge voltage; and
   (e) a comparator, the comparator comparing the magnitude of the first bridge voltage and the second bridge voltage, thereby indicating the sensor which resides in an upstream direction by comparing to reference conditions.

4. The apparatus of claim 3, wherein a thrid temperature sensor resides in the first bridge circuit and a fourth temperature sensor resides in the second bridge circuit, the third and fourth temperature sensors measuring and compensating for ambient fluid temperature with each respective bridge circuit.

5. The apparatus of claim 3 further comprising a third temperature sensor, the third temperature sensor measuring ambient fluid temperature, and supplying a signal proportional to the ambient fluid temperature to the comparator so as to permit compensation or correction of comparator output in response to variations in the ambient fluid temperature.

6. An apparatus for measuring differential pressure comprising:
   (a) a flow passageway between a first chamber and a second chamber, wherein at least one contains a fluid, each chamber being in fluid communication with the other chamber via the flow passageway;

(b) a first thermal sensor element and a second thermal sensor element, each sensor being mounted inside the flow passageway, the sensors being aligned in tandem such that each sensor is directly on a streamline occupied by the other sensor in a horizontal direction, each sensor being a temperatue sensitive element, the temperature sensitive element having an electrical resistance that is function of temperature;

(c) means for connecting each thermal sensor element in series, the series connected sensor elements residing in a bridge circuit wherein the two series connected sensor elements form a first arm of the bridge;

(d) means for causing a current to flow through the two series connected sensor elements, thereby causing each sensor element to be heated above the temperature of a surrounding flowing fluid;

(e) means to regulate the current so as to cause resistance of the two series connected sensors to be held constant given a constant ambient fluid temperature;

(f) means to connect a conductor to a junction between the two sensors;

(g) means to measure a voltage at the junction;

(h) means to calculate which of the two sensors has a higher difference of potential relative to a predetermined reference difference of potential, thereby indicating which sensor is downstream from the other and thus indicating a flow direction and indicating that the upstream sensor is the flow sensor to be used for measuring flow velocity; and (i) a third temperature sensor, the third temperature sensor measuring ambient fluid temperature, and supplying a signal proportional to the abient fluid temperature to the comparator so as to permit compensation or correction of comparator output in response to variations in the ambient fluid temperature.

7. An apparatus for measuring differential pressure comprising:

(a) a flow passageway between a first chamber and a second chamber, wherein at least one contains a fluid, each chamber being in fluid communication with the other chamber via the flow passageway, wherein the flow passageway is horizontally aligned, thereby minimizing convective flow effects;

(b) a first thermal sensor element and a second thermal sensor element, each sensor being mounted inside the flow passageway, the sensors being aligned in tandem such that each sensor is directly on a streamline occupied by the other sensor in a horizontal direction, each sensor being a temperature sensitive element, the temperature sensitive element having an electrical resistance that is a function of temperature;

(c) means for connecting each thermal sensor element in series, the series connected sensor elements residing in a bridge circuit wherein the two series connected sensor elements form a first arm of the bridge;

(d) means for causing a current to flow through the two series connected sensor elements, thereby causing each sensor element to be heated above the temperature of a surrounding flowing fluid;

(e) means to regulate the current so as to cause resistance of the two series connected sensors to be held constant given a constant ambient fluid temperature;

(f) means to connect a conductor to a junction between the two sensors;

(g) means to measure a voltage at the junction; and (h) means to calculate which of the two sensors has a higher difference of potential relative to a predetermined reference difference of potential, thereby indicating which sensor is downstream from the other and thus indicating a flow direction and indicating that the upstream sensor is the flow sensor to be used for measuring flow velocity.

* * * * *